(12) United States Patent
Koyama et al.

(10) Patent No.: US 11,634,589 B2
(45) Date of Patent: Apr. 25, 2023

(54) COATING COMPOSITION AND OPTICAL MEMBER

(71) Applicant: NISSAN CHEMICAL INDUSTRIES, LTD., Tokyo (JP)

(72) Inventors: Yoshinari Koyama, Sodegaura (JP); Tomoki Furukawa, Sodegaura (JP); Motoko Asada, Sodegaura (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/570,534

(22) PCT Filed: Apr. 27, 2016

(86) PCT No.: PCT/JP2016/063209
§ 371 (c)(1),
(2) Date: Oct. 30, 2017

(87) PCT Pub. No.: WO2016/175245
PCT Pub. Date: Mar. 11, 2016

(65) Prior Publication Data
US 2018/0148579 A1 May 31, 2018

(30) Foreign Application Priority Data
Apr. 30, 2015 (JP) .............................. JP2015-093700

(51) Int. Cl.

| | | |
|---|---|---|
| C09D 5/00 | (2006.01) | |
| C09D 183/04 | (2006.01) | |
| G02B 1/11 | (2015.01) | |
| G02B 1/14 | (2015.01) | |
| C09C 3/06 | (2006.01) | |
| C09C 1/00 | (2006.01) | |
| C09C 1/24 | (2006.01) | |
| C09C 1/04 | (2006.01) | |
| C09D 7/40 | (2018.01) | |
| C01B 33/14 | (2006.01) | |
| C09C 1/36 | (2006.01) | |
| C09C 1/14 | (2006.01) | |
| B05D 1/18 | (2006.01) | |
| B05D 3/02 | (2006.01) | |
| C08K 3/36 | (2006.01) | |
| C08K 9/10 | (2006.01) | |
| C08K 3/22 | (2006.01) | |

(52) U.S. Cl.
CPC .............. *C09D 5/006* (2013.01); *B05D 1/18* (2013.01); *B05D 3/0254* (2013.01); *C01B 33/14* (2013.01); *C09C 1/0096* (2013.01); *C09C 1/043* (2013.01); *C09C 1/14* (2013.01); *C09C 1/24* (2013.01); *C09C 1/3661* (2013.01); *C09C 3/06* (2013.01); *C09C 3/063* (2013.01); *C09D 7/40* (2018.01); *C09D 7/67* (2018.01); *C09D 183/04* (2013.01); *G02B 1/11* (2013.01); *G02B 1/14* (2015.01); *C01P 2004/64* (2013.01); *C01P 2004/84* (2013.01); *C01P 2006/22* (2013.01); *C01P 2006/60* (2013.01); *C08K 3/36* (2013.01); *C08K 9/10* (2013.01); *C08K 2003/2231* (2013.01); *C08K 2003/2244* (2013.01); *C08K 2201/011* (2013.01)

(58) Field of Classification Search
None
See application file for complete search history.

(56) References Cited

U.S. PATENT DOCUMENTS

| | | | |
|---|---|---|---|
| 4,211,823 A | 7/1980 | Suzuki et al. | |
| 4,275,118 A | 6/1981 | Baney et al. | |
| 5,188,899 A * | 2/1993 | Matsumoto | ............ B82Y 30/00 |
| | | | 428/405 |
| 6,626,987 B1 * | 9/2003 | Suzuki | ................. B01J 13/0008 |
| | | | 106/286.2 |
| 2002/0064665 A1 * | 5/2002 | Watanabe | ............ C09D 183/04 |
| | | | 428/447 |
| 2002/0157419 A1 * | 10/2002 | Ganguli | .................... C03C 3/06 |
| | | | 65/17.2 |

FOREIGN PATENT DOCUMENTS

| | | |
|---|---|---|
| JP | S53-111336 A | 9/1978 |
| JP | S55-13747 A | 1/1980 |
| JP | S55-106261 A | 8/1980 |
| JP | S56-116003 A | 9/1981 |
| JP | S58-13101 B2 | 3/1983 |
| JP | S62-151801 A | 7/1987 |
| JP | S63-275682 A | 11/1988 |
| JP | S64-54021 A | 3/1989 |
| JP | H02-262104 A | 10/1990 |
| JP | H11-116843 A | 4/1999 |
| JP | H11-199797 A | 7/1999 |
| JP | 2001-123115 A | 5/2001 |
| JP | 2001-348528 A | 12/2001 |
| JP | 2003-292896 A | 10/2003 |
| JP | 2003292896 * | 10/2003 ............... B32B 7/02 |
| JP | 2004-238418 A | 8/2004 |
| JP | 2006-089749 A | 4/2006 |
| JP | 2008-094956 A | 4/2008 |
| JP | 4730487 B2 | 7/2011 |
| JP | 2012-031353 A | 2/2012 |
| JP | 2013-523905 A | 6/2013 |
| WO | 2012/165620 A1 | 12/2012 |

OTHER PUBLICATIONS

MT of JP2003292896 (Year: 2003).*

(Continued)

*Primary Examiner* — John Vincent Lawler
(74) *Attorney, Agent, or Firm* — Oliff PLC

(57) ABSTRACT

There are provided a coating composition being possible to form a cured film which has excellent transparency and weather resistance, and especially hardness. A coating composition obtained by which a silicon-containing substance as a component (M) and a silica colloidal particle having a primary particle diameter of 2 to 80 nm as a component (S) are mixed, and then the component (M) is hydrolyzed, and the resulting aqueous solution is subsequently mixed with a colloidal particle (C) wherein a component (F) is a modified metal oxide colloidal particle (C) having a primary particle diameter of 2 to 100 nm, which includes a metal oxide colloidal particle (A) having a primary particle diameter of 2 to 60 nm as a core, whose surface is coated with a coating (B) formed of an acidic oxide colloidal particle.

13 Claims, No Drawings

(56) References Cited

OTHER PUBLICATIONS

Baldyga et al. ("Precipitation of amorphous colloidal silica from aqueous solutions—Aggregation problem," Chem.Eng.Sci. vol. 77 (2012) 207-216. (Year: 2012).*
Sol _ colloid _ Britannica—Jul. 15, 2022 (Year: 2022).*
Jun. 21, 2016 Search Report issued in International Patent Application No. PCT/JP2016/063209.
Jun. 21, 2016 Written Opinion issued in International Patent Application No. PCT/JP2016/063209.

* cited by examiner

COATING COMPOSITION AND OPTICAL MEMBER

TECHNICAL FIELD

The present invention relates to a coating composition and an optical member in which a coating formed using the coating composition has high hardness as well as excellent transparency and adhesion; furthermore, even When the coating is coated with a vapor-deposited film of an inorganic oxide (such as an anti-reflective coating), the weather resistance and light resistance of the coating do not decrease, and in particular, the coating is substantially completely inhibited from discoloring due to ultraviolet rays.

BACKGROUND ART

Plastic molded articles are used widely by utilizing advantages such as lightweight, easy moldability, and high impact resistance. Conversely, the plastic molded articles have drawbacks such as being readily scratched due to insufficient hardness, being readily affected by a solvent, adsorbing dust by electrostatic charge, and having insufficient heat resistance, which make them disadvantageous for practical use as articles such as glasses lenses and window materials, compared to inorganic glass molded articles. Thus, the application of a protective coating to such a plastic molded article has been proposed. Indeed, a variety of coating compositions used for coating plastic molded articles have been proposed.

A coating composition has been proposed which contains an organosilicon compound or a hydrolysate thereof as a main component (resin component or coating film-forming component) for providing a hard coating similar to an inorganic coating, and further contains a silica sol in which silica is dispersed as a colloid. The coating composition has been put to practical use for glasses lenses (see Patent Document 1).

Conventionally, most of plastic glasses lenses have been produced by cast polymerization using a monomer called diethylene glycol bis(allyl carbonate). These lenses have a refractive index of about 1.50, which is lower than a refractive index of about 1.52 of glass lenses, and thus, have the drawback of having thicker edges for myopia lenses. In recent years, therefore, monomers having refractive indices higher than that of diethylene glycol bis(allyl carbonate) have been developed, and high-refractive-index resin materials have been proposed (see Patent Documents 2 and 3).

Methods using a colloidal dispersion of metal oxide particles of Sb or Ti as a coating material for such high-refractive-index resin lenses have also been proposed (see Patent Documents 4 and 5).

Furthermore, a coating composition comprising a silane coupling agent and a stable modified metal oxide sol is disclosed (see Patent Document 6). The modified metal oxide sol contains particles (C) obtained by coating a surface of metal oxide colloidal particles (A) serving as a core and having a primary particle diameter of 2 to 60 nm, with a coating (B) formed of acidic oxide colloidal particles. The modified metal oxide sol contains 2 to 50% by mass of the particles (C) calculated as metal oxide. The modified metal oxide sol has a primary particle diameter of 2 to 100 nm. A modified titanium oxide-zirconium oxide-tin oxide complex colloid coated with an alkylamine-containing antimony pentoxide, for example, is disclosed as a specific example of the colloidal particles to be used.

Patent Document 7 proposes a composition containing colloidal silica and colloidal titania as a filler for a cured film. The approach disclosed in this document is to add a small amount of colloidal titania to the composition containing colloidal silica as a main component, in order to provide the composition with the function of blocking ultraviolet rays. With this approach, it is virtually difficult to develop a resin lens with a high refractive index, i.e., over 1.55. Furthermore, in one example of this document, a semi-transparent film is provided, which is difficult to use for optical applications that require transparency.

PRIOR ART DOCUMENTS

Patent Documents

Patent Document 1: Japanese Patent Application Publication No. 53-111336 (JP 53-111336 A)
Patent Document 2: Japanese Patent Application Publication No. 55-13747 (JP 55-1374(A)
Patent Document 3: Japanese Patent Application Publication No. 64-54021 (JP 64-54021 A)
Patent Document 4: Japanese Patent Application Publication No. 62-151801 (JP 62-151801 A)
Patent Document 5: Japanese Patent Application Publication No. 63-275682 (JP 63-275682 A)
Patent Document 6: Japanese Patent Application Publication No. 2001-123115 (JP 2001-123115 A)
Patent Document 7: Japanese Patent Application Publication No. 58-13101 (JP 58-13101 B)

SUMMARY OF THE INVENTION

Problem to be Solved by the Invention

In general, hydrolysis of an organosilicon compound is performed by adding water and one or more inorganic acids such as hydrochloric acid, acetic acid, and the like. A coating composition containing a silica sol provides a cured film having high transparency and high hardness. When, however, such a cured film is formed on a lens substrate having a refractive index of 1.55 or more, interference fringes are produced on the cured film, resulting in a poor appearance of the lens. Furthermore, the lens surface typically has an anti-reflective coating (a film with a multilayer structure of inorganic oxide thin films based on the theory of optical interference) formed on the cured film. In this case, the anti-reflective coating exhibits a very light green reflected color, for example. This reflected color changes depending on the position on the lens surface, thus producing variations.

To inhibit interference fringes on the cured film, a coating composition containing a high-refractive-index sol such as a titanium oxide sol, a zirconium oxide sol, or a tin oxide sol may be used, for example. Compared to a silica sol, however, such a high-refractive-index sol has low binding properties to an organosilicon compound, making it difficult to achieve a sufficient hardness of the cured film. Furthermore, a titanium oxide sol suffers from poor compatibility with an organosilicon compound or its hydrolysate. Thus, a coating composition obtained by mixing such a titanium oxide sol with an organosilicon compound or its hydrolysate has poor dispersion stability. A cured film formed using the coating composition also has the drawback of having poor water resistance, and turning blue due to the titanium oxide being excited by ultraviolet radiation. Additionally, because of the photocatalytic activity of the titanium oxide, the cured film develops cracks under ultraviolet radiation. Thus, the cured film has poor adhesion with a high-refractive-index resin lens and with an anti-reflective coating formed as an upper layer of the cured film, resulting in problems such as peeling of the film. In the case of a cured film formed using a coating composition containing a zirconium oxide sol, the zirconium oxide lacks ultraviolet-absorbing properties; therefore, the cured film allows ultraviolet rays to pass through when it is exposed to sunlight for a long period, which causes the substrate to turn yellow.

Furthermore, high-refractive-index particles and silica particles may be mixed, in order to reinforce the hardness of the cured film with the silica, and reinforce the refractive index with the high-refractive-index particles such as titanium oxide or zirconium oxide. This method has the advantage of allowing the refractive index of the cured film to be adjusted as desired. The method, however, has the problem of causing aggregation of the high-refractive-index particles and silica particles due to a difference in surface potential between these particles, resulting in clouding of the cured film.

Furthermore, a difference in refractive index between the silica particles and the high-refractive-index particles such as titanium oxide or zirconium oxide causes internal scattering of light in the cured film, resulting in problems such as interference fringes and clouding.

An object of the present invention is to provide a coating composition having improved compatibility stability between a high-refractive-index sol, and an organosilicon compound and a hydrolysate thereof, which serve as matrix components of the coating composition, and through the provision of such a coating composition having excellent compatibility stability, further provide an optical member having a cured film that is free of the above-described problems (in particular, interference fringes, clouding, and insufficient hardness), and is excellent in characteristics such as scratch resistance, surface hardness, abrasion resistance, flexibility, transparency, antistatic properties, dye affinity, heat resistance, water resistance, and chemical resistance.

Means for Solving the Problem

As a result of extensive research, the present inventors have found that a coating composition in which silica colloidal particles and high-refractive-index particles are mixed without being aggregated can be achieved by performing hydrolysis of an organosilicon compound using silica colloidal particles as a catalyst.

A first aspect of the present invention provides a coating composition comprising a component (M), a component (F), and a component (S), wherein the component (M) is at least one silicon-containing substance selected from the group consisting of organosilicon compounds of general formula (I):

(I)

(wherein each of $R^1$ and $R^3$ is a $C_{1-35}$ alkyl group, an aryl group, a halogenated alkyl group, a halogenated aryl group, an alkenyl group, or an organic group having an epoxy group, an acryloyl group, a methacryloyl group, a mercapto group, a ureido group, an ether group, an amino group, or a cyano group, and is bonded to a silicon atom through a Si—C bond; $R^2$ is a $C_{1-8}$ alkyl group, an alkoxyalkyl group, or an acyl group; and each of a and b is an integer of 0, 1, or 2, and a+b is an integer of 0, 1, or 2); or general formula (II):

(II)

(wherein $R^4$ is a $C_{1-5}$ alkyl group; X is a $C_{1-4}$ alkyl group or an acyl group; Y is a methylene group or a $C_{2-20}$ alkylene group; and c is an integer of 0 or 1); and hydrolysates thereof;

the silicon-containing substance contains at least one hydrolysate of the organosilicon compounds, and is contained in an amount of 20 to 85% by mass in the coating composition;

the component (F) is a modified metal oxide colloidal particle (C) having a primary particle diameter of 2 to 100 nm, which includes a metal oxide colloidal particle (A) having a primary particle diameter of 2 to 60 nm as a core, whose surface is coated with a coating (B) formed of an acidic oxide colloidal particle having a primary particle diameter of 1 to 4 nm, and the colloidal particle (C) is contained in an amount of 10 to 60% by mass in the coating composition; and the component (S) is a silica colloidal particle having a primary particle diameter of 2 to 80 nm, and is contained in an amount of 0.1 to 30% by mass in the coating composition;

a second aspect of the present invention provides the coating composition according to the first aspect, wherein the component (S) is contained in an amount of 1 to 20% by mass;

a third aspect of the present invention provides the coating composition according to the first or second aspect, wherein a mass ratio of the component (F) to the component (M) is component (F)-component (M)=0.1 to 3, and a mass ratio of the component (S) to the component (M) is component (S)/component (M)=0.01 to 1.5;

a fourth aspect of the present invention provides the coating composition according to any one of the first to third aspects, wherein the metal oxide colloidal particle (A) is formed of an oxide of at least one metal selected from the group consisting of Ti, Fe, Cu, Zn, Y, Zr, Nb, Mo, In, Sn, Sb, Ta, W, Pb, Bi, and Ce;

a fifth aspect of the present invention provides the coating composition according to any one of the first to third aspects, wherein the coating (B) is formed of an acidic oxide of at least one metal selected from the group consisting of Si, Zr, Sn, Mo, Sb, and W;

a sixth aspect of the present invention provides the coating composition according to any one of the first to fifth aspects, wherein the component (S) has a pH of 1 to 6;

a seventh aspect of the present invention provides the coating composition according to any one of the first to sixth aspects, which further comprises at least one curing catalyst selected from the group consisting of metal salts, metal alkoxides, and metal chelate compounds;

an eighth aspect of the present invention provides the coating composition according to any one of the first to seventh aspects, which further comprises at least one solvent selected from the group consisting of alcohol-based organic solvents, ether-based organic solvents, ketone-based organic solvents, ester-based organic solvents, aliphatic hydrocarbon-based organic solvents, aromatic hydrocarbon-based organic solvents, and amide compound-based organic solvents;

a ninth aspect of the present invention provides the coating composition according to any one of the first to eighth aspects, which further comprises at least one surfactant selected from the group consisting of silicone-based surfactants, acrylic-based surfactants, and fluorosurfactants;

a tenth aspect of the present invention provides an optical member comprising a cured film formed of a cured product of the coating composition according to any one of the first to ninth aspects on a surface of an optical substrate;

an eleventh aspect of the present invention provides an optical member further comprising an anti-reflective coating on a surface of the optical member according to the tenth aspect; and a twelfth aspect of the present invention provides a method for producing the coating composition according to any one of the first to ninth aspects, comprising the following steps (a) and (b):

step (a): mixing the component (M) and the component (S) each specified in any one of the first to ninth aspects with at least partially or completely hydrolyze the component (M); and step (b): mixing the mixture obtained in step (a) containing the at least partially or completely hydrolyzed product of the component (M), with the component (F) specified in any one of the first to ninth aspects.

Effects of the Invention

The cured film formed using the coating composition of the present invention has hardness characteristics and adhesion characteristics achieved by the addition of silica colloidal particles as a filler, as well as refractive-index characteristics achieved by the addition of high-refractive-index particles as a filler. The cured film also has excellent abrasion resistance, transparency, heat resistance, light resistance, and weather resistance. The cured film also has good adhesive properties to an anti-reflective coating (formed of an inorganic oxide, a fluoride, or the like) or a metal vapor-deposited film formed on the cured film.

The optical member having the cured film prepared using the coating composition of the present invention can be used for glasses lenses as well as camera lenses, windshields for automobiles, and optical filters for liquid crystal displays and plasma displays, for example.

MODES FOR CARRYING OUT THE INVENTION

Representative examples of the groups herein defined in formula (I) and (II) above will be mentioned below Examples of the $C_{1-35}$ alkyl group include linear or branched alkyl groups having a carbon atom number of 1 to 35, for example, methyl group, ethyl group, n-propyl group, i-propyl group, n-butyl group, i-butyl group, s-butyl group, t-butyl group, n-pentyl group, 1-methyl-n-butyl group, 2-methyl-n-butyl group, 3-methyl-n-butyl group, 1,1-dimethyl-n-propyl group, 1,2-dimethyl-n-propyl group, 2,2-dimethyl-n-propyl group, 1-ethyl-n-propyl group, n-hexyl, 1-methyl-n-pentyl group, 2-methyl-n-pentyl group, 3-methyl-n-pentyl group, 4-methyl-n-pentyl group, 1,1-dimethyl-n-butyl group, 1,2-dimethyl-n-butyl group, 1,3-dimethyl-n-butyl group, 2,2-dimethyl-n-butyl group, 2,3-dimethyl-n-butyl group, 3,3-dimethyl-n-butyl group, 1-ethyl-n-butyl group, 2-ethyl-n-butyl group, 1,1,2-trimethyl-n-propyl group, 1,2,2-trimethyl-n-propyl group, 1-ethyl-1-methyl-n-propyl group, 1-ethyl-2-methyl-n-propyl group, n-heptyl group, n-octyl group, n-nonyl group, n-decyl group, n-undecyl group, n-dodecyl group, n-tridecyl group, n-tetradecyl group, n-pentadecyl group, n-hexadecyl group, n-heptadecyl group, n-octadecyl group, n-nonadecyl group, and n-eicosyl group.

Cyclic alkyl groups may also be used; examples of cyclic alkyl groups having a carbon atom number of 3 to 20, for example, include cyclopropyl group, cyclobutyl group, 1-methyl-cyclopropyl group, 2-methyl-cyclopropyl group, cyclopentyl group, 1-methyl-cyclobutyl group, 2-methyl-cyclobutyl group, 3-methyl-cyclobutyl group, 1,2-dimethyl-cyclopropyl group, 2,3-dimethyl-cyclopropyl group, 1-ethyl-cyclopropyl group, 2-ethyl-cyclopropyl group, cyclohexyl group, 1-methyl-cyclopentyl group, 2-methyl-cyclopentyl group, 3-methyl-cyclopentyl group, 1-ethyl-cyclobutyl group, 2-ethyl-cyclobutyl group, 3-ethyl-cyclobutyl group, 1,2-dimethyl-cyclobutyl group, 1,3-dimethyl-cyclobutyl group, 2,2-dimethyl-cyclobutyl group, 2,3-dimethyl-cyclobutyl group, 2,4-dimethyl-cyclobutyl group, 3,3-dimethyl-cyclobutyl group, 1-n-propyl-cyclopropyl group, 2-n-propyl-cyclopropyl group, 1-i-propyl-cyclopropyl group, 2-i-propyl-cyclopropyl group, 1,2,2-trimethyl-cyclopropyl group, 1,2,3-trimethyl-cyclopropyl group, 2,2,3-trimethyl-cyclopropyl group, 1-ethyl-2-methyl-cyclopropyl group, 2-ethyl-1-methyl-cyclopropyl group, 2-ethyl-2-methyl-cyclopropyl group, 2-ethyl-3-methyl-cyclopropyl group, adamantane group, norbornene group, and norbornane group.

Examples of the $C_{1-8}$ alkyl group in the definition of $R^2$ above, the $C_{1-5}$ alkyl group in the definition of $R^4$ above, and the $C_{1-4}$ alkyl group in the definition of X above include $C_{1-8}$ alkyl groups, $C_{1-5}$ alkyl groups, and $C_{1-4}$ alkyl groups, respectively, from the above-mentioned alkyl groups.

Examples of the aryl group include $C_{6-40}$ aryl groups, for example, phenyl group, o-methylphenyl group, m-methylphenyl group, p-methylphenyl group, o-chlorophenyl group, m-chlorophenyl group, p-chlorophenyl group, o-fluorophenyl group, p-mercaptophenyl group, o-methoxyphenyl group, p-methoxyphenyl group, p-aminophenyl group, p-cyanophenyl group, α-naphthyl group, β-naphthyl group, o-biphenylyl group, m-biphenylyl group, p-biphenylyl group, 1-anthryl group, 2-anthryl group, 9-anthryl group, 1-phenanthryl group, 2-phenanthryl group, 3-phenanthryl group, 4-phenanthryl group, and 9-phenanthryl group.

Examples of the halogenated alkyl group and the halogenated aryl group include the above-mentioned alkyl groups and aryl groups substituted with halogen groups, which include, for example, fluorine, chlorine, bromine, and iodine.

Examples of the alkenyl group include $C_{2-10}$ alkenyl groups, for example, ethenyl group, 1-propenyl group, 2-propenyl group, 1-methyl-1-ethenyl group, 1-butenyl group, 2-butenyl group, 3-butenyl group, 2-methyl-1-propenyl group, 2-methyl-2-propenyl group, 1-ethylethenyl group, 1-methyl-1-propenyl group, 1-methyl-2-propenyl group, 1-pentenyl group, 2-pentenyl group, 3-pentenyl group, 4-pentenyl group, 1-n-propylethenyl group, 1-methyl-1-butenyl group, 1-methyl-2-butenyl group, 1-methyl-3-butenyl group, 2-ethyl-2-propenyl group, 2-methyl-1-butenyl group, 2-methyl-2-butenyl group, 2-methyl-3-butenyl group, 3-methyl-1-butenyl group, 3-methyl-2-butenyl group, 3-methyl-3-butenyl group, 1,1-dimethyl-2-propenyl group, 1-i-propylethenyl group, 1,2-dimethyl-1-propenyl group, 1,2-dimethyl-2-propenyl group, 1-cyclopentenyl group, 2-cyclopentenyl group, 3-cyclopentenyl group, 1-hexenyl group, 2-hexenyl group, 3-hexenyl group, 4-hexenyl group, 5-hexenyl group, 1-methyl-1-pentenyl group, 1-methyl-2-pentenyl group, 1-methyl-3-pentenyl group, 1-methyl-4-pentenyl group, 1-n-butylethenyl group, 2-methyl-1-pentenyl group, 2-methyl-2-pentenyl group, 2-methyl-3-pentenyl group, 2-methyl-4-pentenyl group, 2-n-propyl-2-propenyl group, 3-methyl-1-pentenyl group, 3-methyl-2-pentenyl group, 3-methyl-3-pentenyl group, 3-methyl-4-pentenyl group, 3-ethyl-3-butenyl group, 4-methyl-1-pentenyl group, 4-methyl-2-pentenyl group, 4-methyl-3-pentenyl group, 4-methyl-4-pentenyl group, 1,1-dimethyl-2-butenyl group, 1,1-dimethyl-3-butenyl group, 1,2-dimethyl-1-butenyl group, 1,2-dimethyl-2-butenyl group, 1,2-dimethyl-3-butenyl group, 1-methyl-2-ethyl-2-propenyl group, 1-s-butylethenyl group, 1,3-dimethyl-1-butenyl group, 1,3-dimethyl-2-butenyl group, 1,3-dimethyl-3-butenyl group, 1-i-butylethenyl group, 2,2-dimethyl-3-butenyl group, 2,3-dimethyl-1-butenyl group, 2,3-dimethyl-2-butenyl group, 2,3-dimethyl-3-butenyl group, 2-i-propyl-2-propenyl group, 3,3-dimethyl-1-butenyl group, 1-ethyl-1-butenyl group, 1-ethyl-2-butenyl group, 1-ethyl-3-butenyl group, 1-n-propyl-1-propenyl group, 1-n-propyl-2-propenyl group, 2-ethyl-1-butenyl group, 2-ethyl-2-butenyl group, 2-ethyl-3-butenyl group, 1,1,2-trimethyl-2-propenyl group, 1-t-butylethenyl group, 1-methyl-1-ethyl-2-propenyl group, 1-ethyl-2-methyl-1-propenyl group, 1-ethyl-2-methyl-2-propenyl group, 1-i-propyl-1-propenyl group, 1-i-propyl-2-propenyl group, 1-methyl-2-cyclopentenyl group, 1-methyl-3-cyclopentenyl group, 2-methyl-1-cyclopentenyl group, 2-methyl-2-cyclopentenyl group, 2-methyl-3-cyclopentenyl group, 2-methyl-4-cyclopentenyl group, 2-methyl-5-cyclopentenyl group, 2-methylene-cyclopentyl group, 3-methyl-1-cyclopentenyl group, 3-methyl-2-cyclopentenyl group, 3-methyl-3-cyclopentenyl group, 3-methyl-4-cyclopentenyl group, 3-methyl-5-cyclopentenyl group, 3-methylene-cyclopentyl group, 1-cyclohexenyl group, 2-cyclohexenyl group, and 3-cyclohexenyl group.

Examples of the organic group having an epoxy group include glycidoxymethyl group, glycidoxyethyl group, glycidoxypropyl group, glycidoxybutyl group, glycidoxyoctyl group, and epoxycyclohexyl group.

Examples of the organic group having an acryloyl group include acryloylmethyl group, acryloylethyl group, acryloylpropyl group, and acryloyloctyl group.

Examples of the organic group having a methacryloyl group include methacryloylmethyl group, methacryloylethyl group, methacryloylpropyl group, and methacryloyloctyl group.

Examples of the organic group having a mercapto group include ethylmercapto group, propylmercapto group, butylmercapto group, hexylmercapto group, and octylmercapto group.

Examples of the organic group having a ureido group include ureidoethyl group, ureidopropyl group, ureidobutyl group, ureidohexyl group, and ureidooctyl group.

Examples of the organic group having an ether group include ethyl ether group and propyl ether group.

Examples of the organic group having an amino group include amino group, aminomethyl group, aminoethyl group, aminopropyl group, aminohexyl group, and aminooctyl group.

Examples of the organic group having a cyano group include cyanoethyl group, cyanopropyl group, cyanobutyl group, and cyanooctyl group.

The alkoxyalkyl group is an alkoxy group-substituted alkyl group, for example, methoxymethyl group, ethoxymethyl group, or ethoxyethyl group.

Specific examples of the acyl group include formyl group, acetyl group, propionyl group, butyryl group, and isobutyryl group.

Examples of the $C_{2-20}$ alkylene group in the definition of Y above include alkylene groups derived from $C_{2-20}$ alkyl groups from the above-mentioned alkyl groups. Examples of such alkylene groups include methylene group derived from methyl group, ethylene group derived from ethyl group, and propylene group derived from propyl group.

The component (M) used in the coating composition of the present invention is at least one silicon-containing substance selected from the group consisting of organosilicon compounds of general formula (I):

$$(R^1)_a(R^3)_b Si(OR^2)_{4-(a+b)} \quad (I)$$

(wherein each of $R^1$ and $R^3$ is a $C_{1-35}$ alkyl group, an aryl group, a halogenated alkyl group, a halogenated aryl group, an alkenyl group, or an organic group having an epoxy group, an acryloyl group, a methacryloyl group, a mercapto group, a ureido group, an ether group, an amino group, or a cyano group, and is bonded to a silicon atom through a Si—C bond; $R^2$ is a $C_{1-8}$ alkyl group, an alkoxyalkyl group, or an acyl group; and each of a and b is an integer of 0, 1, or 2, and a+b is an integer of 0, 1, or 2); or general formula (II):

$$[(R^4)_c Si(OX)_{3-c}]_2 Y \quad (II)$$

(wherein $R^4$ is a $C_{1-5}$ alkyl group; X is a $C_{1-4}$ alkyl group or an acyl group; Y is a methylene group or a $C_{2-20}$ alkylene group; and c is an integer of 0 or 1); and hydrolysates thereof. The silicon-containing substance contains at least one hydrolysate of the organosilicon compounds.

Examples of the organosilicon compounds of general formula (I) above include tetramethoxysilane, tetraethoxysilane, tetra-n-propoxysilane, tetraisopropoxysilane, tetra-n-butoxysilane, tetraacetoxysilane, methyltrimethoxysilane, methyltriethoxysilane, methyltripropoxysilane, methyltriacetoxysilane, methyltributoxysilane, methyltriamyloxysilane, methyltriphenoxysilane, methyltribenzyloxysilane, methyltriphenethyloxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4epoxycyclohexyl)butyltrimethoxysilane, δ-(3,4-epoxycyclohexyl)butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylethyldimethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, ethyltrimethoxysilane, ethyltriethoxysilane, vinyltrimethoxysilane, vinyltriethoxysilane, vinyltriacetoxysilane, phenyltrimethoxysilane, phenyltriethoxysilane, phenyltriacetoxysilane, γ-chloropropyltrimethoxysilane, γ-chloropropyltriethysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl)-γ-aminopropyltrimethoxysilane, N-(β-aminoethyl)-γ-aminopropylmethyldimethoxysilane, γ-aminopropylmethyldimethoxysilane, N-(β-aminoethyl)-γ-aminopropyltriethoxysilane, N-(β-aminoethyl)-γ-aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptomethyldiethoxysilane, 3-ureidopropyltrimethoxysilane, 3-ureidopropyltriethoxysilane, methylvinyldimethoxysilane, and methylvinyldiethoxysilane. These organosilicon compounds may be used alone or in combination of two or more.

A hydrolysate of an organosilicon compound of general formula (I) above is a compound in which $R^2$ has been partially or completely substituted with hydrogen atoms, by hydrolysis of the organosilicon compound of general formula (I) above.

Examples of the organosilicon compounds of general formula (II) above include methylenebis(methyldimethoxysilane), ethylenebis(ethyldimethoxysilane), propylenebis(ethyldiethoxysilane), and butylenebis(methyldiethoxysilane). These organosilicon compounds may be used alone or in combination of two or more.

A hydrolysate of an organosilicon compound of general formula (II) above is a compound in which X has been partially or completely substituted with hydrogen atoms.

The component (M) used in the coating composition of the present invention is preferably at least one silicon-containing substance selected from the group consisting of organosilicon compounds of general formula (I) and hydrolysates thereof. The silicon-containing substance contains a hydrolysate of at least one organosilicon compound. In particular, the component (M) is preferably an organosilicon compound of general formula (I) Wherein one of $R^1$ and $R^3$ is an organic group having an epoxy group; $R^2$ is an alkyl group; and each of a and b is 0 or 1, and a+b is 1 or 2; or a hydrolysate thereof.

In particular, preferred examples of the organosilicon compounds of general formula (I) above as the component (M) include glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, γ-glycidoxyoctyltrimethoxysilane, γ-glycidoxyoctyltriethoxysilane, γ-glycidoxyoctylpropoxysilane, γ-glycidoxyoctyltributoxysilane, γ-glycidoxyoctylmethyldimethoxysilane, and γ-glycidoxyoctylmethyldiethoxysilane.

More preferred are γ-glycidoxypropyltrimethoxysilane, γ-glycidoxypropylmethyldiethoxysilane, γ-glycidoxypropylmethyldimethoxysilane, and γ-glycidoxyoctyltrimethoxysilane. These organosilicon compounds may be used alone or as a mixture.

Furthermore, γ-glycidoxypropyltrimethoxysilane, γ-glycidoxypropylmethyldiethoxysilane, γ-glycidoxypropylmethyldimethoxysilane, or γ-glycidoxyoctyltrimethoxysilane may be used in combination with a tetrafunctional compound of general formula (I) wherein a+b=0. Examples of such tetrafunctional compounds include tetramethoxysilane, tetraethoxysilane, tetraisopropoxysilane, tetra-n-propoxysilane, tetra-n-butoxysilane, tetra-tert-butoxysilane, and tetra-sec-butoxysilane.

The component (F) used in the coating composition of the present invention is a modified metal oxide colloidal particle (C) having a primary particle diameter of 2 to 100 nm, which includes a metal oxide colloidal particle (A) having a primary particle diameter of 2 to 60 am as a core, whose surface is coated with a coating (B) formed of an acidic oxide colloidal particle having a primary particle diameter of 1 to 4 nm.

In the present invention, the primary particle diameter can be measured herein by transmission electron microscopic observation. The primary particle diameter is an average value of measured diameters of 100 colloidal particles observed in a field of view at 200,000× magnification.

The metal oxide colloidal particle (A) can be produced using a known method such as an ion exchange method, a peptization method, a hydrolysis method, or a reaction method. Examples of the ion exchange method include a method in which an acidic salt of the metal is treated with a hydrogen-type ion exchange resin; and a method in which a basic salt of the metal is treated with a hydroxyl group-type anion exchange resin. Examples of the peptization method include a method in which a gel obtained by neutralizing an acidic salt of the metal with a base or by neutralizing a basic salt of the metal with an acid is washed and then peptized with an acid or base. Examples of the hydrolysis method include a method in which an alkoxide of the metal is hydrolyzed; and a method in which a basic salt of the metal is hydrolyzed with heating, and then any unwanted acid is removed from the hydrolysate. Examples of the reaction method include a method in which powder of the metal is reacted with an acid.

The metal oxide colloidal particle (A) is formed of an oxide of at least one metal selected from the group consisting of Ti, Fe, Cu, In, Y, Zr, Nb, Mo, In, Sn, Sb, Ta, W, Pb, Bi, and Ce. The metal oxide colloidal particle (A) is formed of an oxide of a metal with a valence of 2 to 6, and examples of forms of oxides of such metals include $TiO_2$, $Fe_2O_3$, CuO, ZnO, $ZrO_2$, $Nb_2O_5$, $MoO_3$, $In_2O_3$, $SnO_2$, $Sb_2O_5$, $Ta_2O_5$, $WO_3$, PbO, and $Bi_2O_3$. These metal oxides may be used alone or in combination. A combination of metal oxides may be produced by, for example, mixing several types of the above-mentioned metal oxides, complexing any of the above-mentioned metal oxides, or forming a solid solution of any of the above-mentioned metal oxides at the atomic level.

Examples of such combinations include $SnO_2$—$WO_3$ complex colloidal particles in which $SnO_2$ particles and $WO_3$ particles have been complexed by chemical bonding at the interface; $SnO_2$—$ZrO_2$ complex colloidal particles in which $SnO_2$ particles and $ZrO_2$ particles have been complexed by chemical bonding at the interface; and $TiO_2$—$ZrO_2$—$SnO_2$ complex colloidal particles obtained by the formation of a solid solution of $TiO_2$, $ZrO_2$, and $SnO_2$ at the atomic level.

The metal oxide colloidal particle (A) may also be used as a compound, depending on the combination of metal components; examples of such compounds include $ZnSb_2O_6$, $InSbO_4$, and $ZnSnO_3$.

In the present invention, the modified metal oxide colloidal particle (C) is obtained as the component (F) by coating a surface of the metal oxide colloidal particle (A) that serves as a core, with the coating (B) formed of an acidic oxide colloidal particle having a primary particle diameter of 1 to 4 nm.

The acidic oxide used as the coating (B) is formed of colloidal particles of an oxide of at least one metal selected from the group consisting of Si, Sn, Mo, Sb, and W. Examples of forms of such metal oxides of the coating (B) include $SiO_2$, $SnO_2$, $MoO_3$, $Sb_2O_5$, and $WO_3$. These acidic oxides may be used alone or in combination. A combination of acidic oxides may be produced by, for example, mixing several types of the above-mentioned acidic oxides, complexing any of the above-mentioned acidic oxides, or forming a solid solution of any of the above-mentioned acidic oxides at the atomic level.

Examples of such combinations include $SnO_2$—$WO_3$ complex colloidal particles in which $SnO_2$ particles and $WO_3$ particles have been complexed by chemical bonding at the interface; $SnO_2$—$SiO_2$ complex colloidal particles in which $SnO_2$ particles and $SiO_2$ particles have been complexed by chemical bonding at the interface; $SnO_2$—$WO_3$—$SiO_2$ complex colloidal particles in which $SnO_2$ particles, $WO_3$ particles, and $SiO_2$ particles have been complexed by chemical bonding at the interface; $SnO_2$—$MO_3$—$SiO_2$ complex colloidal particles in which $SnO_2$ particles, $MO_3$ particles, and $SiO_2$ particles have been complexed by chemical bonding at the interface; and $Sb_2O_5$—$SiO_2$ complex colloidal particles in which $Sb_2O_5$ particles and $SiO_2$ particles have been complexed by chemical bonding at the interface.

The coating (B) can be produced using a known method such as an ion exchange method or an oxidation method. Examples of the ion exchange method include a method in which an acidic salt of the metal is treated with a hydrogen-type ion exchange resin. Examples of the oxidation method (reaction method) include a method in which powder of the metal or metal oxide is reacted with hydrogen peroxide.

Examples of methods for producing the modified metal oxide colloidal particle (C) as the element constituting the component (F) include those described in WO 12/165620 and Japanese Patent No. 4,730,487.

The sol of the modified metal oxide colloidal particle (C) used as the component (F) may contain any other components, as long as the purpose of the present invention can be achieved. In particular, the sol may contain about 30% by mass or less of oxycarboxylic acids based on the total mass of all metal oxides. In this case, a colloid having further improved performance in terms of dispersibility and the like can be obtained. Examples of the oxycarboxylic acid to be used include lactic acid, tartaric acid, citric acid, gluconic acid, malic acid, and glycol.

The sol of the modified metal oxide colloidal particle (C) used as the component (F) may also contain an alkaline component. Examples of the alkaline component include hydroxides of alkali metals such as Li, Na, K, Rb, and Cs; alkylamines such as ammonia, ethylamine, triethylamine, isopropylamine, and n-propylamine; aralkylamines such as benzylamine; alicyclic amines such as piperidine; and alkanolamines such as monoethanolamine and triethanolamine. The sol may contain a mixture of two or more of these alkaline components. Moreover, the sol may contain about 30% by mass or less of the alkaline component based on the total mass of all metal oxides. The alkaline component may be used in combination with the oxycarboxylic acid.

When the sol of the modified metal oxide colloidal particle (C) is an aqueous sol, the aqueous medium of the aqueous sol may be replaced with a hydrophilic organic solvent to produce an organosol. The solvent replacement may be accomplished using a common method such as distillation or ultrafiltration. Examples of the hydrophilic organic solvent include lower alcohols such as methyl alcohol, ethyl alcohol, and isopropyl alcohol; linear amides such as dimethylformamide and N,N'-dimethylacetamide; cyclic amides such as N-methyl-2-pyrrolidone; and glycols such as ethyl cellosolve and ethylene glycol.

The coating composition of the present invention contains 10 to 150 parts by mass of the modified metal oxide colloidal particle (C), per 100 parts by mass of the silicon-containing substance.

The component (S) used in the coating composition of the present invention is a silica colloidal particle having a primary particle diameter of 2 to 80 nm. If the primary particle diameter is less than 2 nm, it will be difficult to achieve a high concentration of the sol of the silica colloidal particles, and the amount of moisture brought into the coating composition will increase, possibly causing gelation of the coating composition, which is undesirable. Conversely, if the primary particle diameter is 80 nm or more, the transparency of a cured film obtained by curing the coating composition will decrease, making the cured film unsuitable for optical applications that require transparency.

The component (S) contained in the coating composition of the present invention may be produced using a known method such as an ion exchange method, peptization by neutralization, or alkoxide hydrolysis.

The pH of the component (S) is preferably adjusted to 1 to 6.

The coating composition of the present invention contains the components (M), (F), and (S), wherein the content of the component (M) is 20 to 85% by mass, and preferably 35 to 70% by mass, in the coating composition.

If the content of the component (M) in the coating composition is less than 20% by mass, the curing properties of the cured film will significantly decrease, making the cured film susceptible to scratches. The cured film may not even become cured. Conversely, if the content of the component (M) exceeds 85% by mass, the cured film may be subjected to a large shrinkage upon curing, causing peeling between the cured film and the substrate.

The content of the component (S) is 0.1 to 30% by mass, and preferably 1 to 20% by mass, in the coating composition. If the content of the component (S) in the coating composition is less than 0.1% by mass, hydrolysis of the component (M) is less likely to occur, making it less likely to achieve a film with a high hardness. Conversely, if the content of the component (S) exceeds 30% by mass, the refractive index of the cured film will significantly decrease, resulting in problems such as interference fringes and clouding, which is undesirable.

The content of the colloidal particles in the component (F) is 10 to 60% by mass, and preferably 20 to 55% by mass, in the coating composition.

In the coating composition of the present invention, it is preferred that the mass ratio of the component (F) to the component (M) be component (F)/component (M)=0.1 to 3, and the mass ratio of the component (S) to the component (M) be component (S)/component (M)=0.01 to 1.5. If the ratio of the component (F) to the component (M) is excessively low, the scratch resistance of the cured film will decrease; conversely, if this ratio is excessively high, the film will readily develop cracks upon curing. Furthermore, if the ratio of the component (S) to the component (M) is excessively low, a film with a high hardness cannot be achieved; conversely, if this ratio is excessively high, the refractive index of the cured film tends to decrease.

In the method for producing the, coating composition of the present invention, hydrolysis of the organosilicon compound in the component (M) is performed using the silica colloidal particles of the component (S) as a catalyst.

The method for producing the coating composition of the present invention includes the following steps (a) and (b):

step (a): mixing the component (M) and the component (S) with at least partially or completely hydrolyze the component (M); and step (b): mixing the mixture obtained in step (a) containing the at least partially or completely hydrolyzed product of the component (M), with the component (F).

Through these steps, a coating composition having compatibility stability between the silica colloidal particles and the high-refractive-index particles can be produced.

The coating composition of the present invention may further contain a curing catalyst to accelerate the curing reaction. Examples of the curing catalyst include amines such as allylamine and ethylamine; organic carboxylic acids or metal salts thereof; inorganic acids such as chromic acid, hypochlorous acid, boric acid, perchloric acid, bromic acid, selenous acid, thiosulfuric acid, orthosilicic acid, thiocyanic acid, nitrous acid, aluminic acid, and carbonic acid, or metal salts thereof; alkoxides of aluminum, zirconium, and titanium; and metal chelate compounds such as aluminum acetylacetonate.

The coating composition of the present invention may also contain various particulate metal oxides to match the refractive index to that of the lens to be used as the substrate. Examples of such particulate metal oxides include particles of aluminum oxide, titanium oxide, antimony pentoxide, zirconium oxide, silica, cerium oxide, and the like having a primary particle diameter of 2 to 60 nm.

The coating composition of the present invention may further contain an organic solvent that can dissolve the component (M). Examples of such organic solvents include alcohol-based organic solvents, ether-based organic solvents, ketone-based organic solvents, ester-based organic solvents, aliphatic hydrocarbon-based organic solvents, aromatic hydrocarbon-based organic solvents, and amide compound-based organic solvents.

Examples of the alcohol-based organic solvents include monohydric alcohols such as methyl alcohol, ethyl alcohol, propyl alcohol, and butyl alcohol; polyhydric alcohols such as ethylene glycol, diethylene glycol, propylene glycol, glycerol, trimethylolpropan and hexanetriol; and monoethers of polyhydric alcohols such as ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, propylene glycol monomethyl ether, propylene glycol monoethyl ether, propylene glycol monopropyl ether, and propylene glycol monobutyl ether.

Examples of the ether-based organic solvents include the above-mentioned monoethers of polyhydric alcohols, as well as polyhydric alcohol ethers in which all hydroxyl groups of the polyhydric alcohols have been alkyl-etherified, such as ethylene glycol dimethyl ether, ethylene glycol diethyl ether, ethylene glycol dipropyl ether, ethylene glycol dibutyl ether, propylene glycol dimethyl ether, propylene glycol diethyl ether, propylene glycol dibutyl ether, diethylene glycol dimethyl ether, diethylene glycol methyl ethyl ether, and diethylene glycol diethyl ether; and tetrahydrofuran, 1,4-dioxane, and anisole.

Examples of the ketone-based organic solvents include acetone, methyl ethyl ketone, methyl isobutyl ketone, and methyl isoamyl ketone.

Examples of the ester-based organic solvents include methyl acetate, ethyl acetate, and butyl acetate.

Examples of the aliphatic hydrocarbon-based organic solvents include hexane, heptane, octane, nonane, and decane.

Examples of the aromatic hydrocarbon-based organic solvents include benzene, toluene, and xylene.

Examples of the amide compound-based organic solvents include dimethylformamide, dimethylacetamide, and N-methylpyrrolidone.

Preferred among the above are the following solvents in that they readily mix with water; methanol, ethanol, isopropanol, and butanol as alcohol-based organic solvents; ethylene glycol monomethyl ether, diethylene glycol monobutyl ether, propylene glycol monomethyl ether, and propylene glycol monoethyl ether as ether-based organic solvents; acetone, methyl ethyl ketone, and methyl isobutyl ketone as ketone-based organic solvents; and dimethylformamide, dimethylacetamide, and N-methylpyrrolidone as amide compound-based organic solvents, for example.

The above-mentioned organic solvents may be used alone or as a mixture of two or more.

The coating composition of the present invention may further contain a silicone-based surfactant, an acrylic-based surfactant, a fluorosurfactant, or the like, in order to improve the wettability of the coating composition on the substrate, and improve smoothness of the cured film. An ultraviolet absorber, an antioxidant, and the like may also be added to the coating composition of the present invention, as long as they do not affect the physical properties of the cured film. The surfactant may be water-soluble, non-water soluble, or water-dispersible.

Examples of the silicone-based surfactant include polydimethylsiloxane in which a side chain or an end of the main chain has been modified with any of various substituents, for example, oligomers such as ethylene glycol and propylene glycol.

The acrylic-based surfactant is preferably a copolymer of acrylic monomers, and examples of copolymerizable acrylic monomers include (meth)acrylic acid alkyl esters such as methyl (meth)acrylate, ethyl (meth)acrylate, butyl (meth)acrylate, 2-ethylhexyl (meth)acrylate, lauryl (meth)acrylate, octadecyl (meth)acrylate, and hexadecyl (meth)acrylate; aromatic-containing (meth)acrylic acid alkyl esters such as benzyl (meth)acrylate, naphthyl (meth)acrylate, 2-hydroxy-4-methacryloyloxyethoxy-benzophenone, and 3-(2H-1,2,3-benzotriazol-2-yl)-4-hydroxyphenethyl-(meth)acrylate; (meth)acrylic acid alkylene oxide esters such as 2-hydroxyethyl (meth)acrylate, hydroxypropyl (meth)acrylate, and hydroxybutyl (meth)acrylate; (meth)acrylic acid alkyl ether esters that are alkyl (meth)acrylates of 2- to 10-mole monool or diol alkylene oxide adducts, such as triethylene glycol monoethyl ether mono(meth)acrylate, tetraethylene glycol monoethyl ether mono(meth)acrylate, pentaethylene glycol monobutyl ether mono(meth)acrylate, methoxytrioxypropylene tetraoxyethylene (meth)acrylate, and mono(meth)acrylate of 6-mole ethylene oxide adduct of tetrapropylene glycol; (meth)acrylic acid amino alkyl esters such as aminoethyl acrylate and diethylaminoethyl methacrylate; and (meth)acrylic acid amide compounds such as (meth)acrylamide, α-phenyl (meth)acrylamide, N-isopropyl(meth)acrylamide, N-t-octyl(meth)acrylamide, N-n-octyl(meth)acrylamide, N-methylol(meth)acrylamide, N-methoxymethyl (meth)acrylamide, N-ethoxymethyl(meth)acrylamide, N,N'-methylenebis((meth)acrylamide), N-diacetone (Meth)acrylamide, N-(n-butoxymethyl)(meth)acrylamide, N,N-dimethylaminopropyl(meth)acrylamide, N,N-dimethyl(meth)acrylamide, N,N-diethyl(meth)acrylamide, and (meth)acryloylmorpholine.

As the fluorosurfactant, a known surfactant may be used, for example, a surfactant having a perfluoroalkyl group, such as a perfluoroalkylsulfonic acid or a perfluoroalkylcarboxylic acid.

The above-described additional components such as a curing catalyst, a particulate metal oxide, an organic solvent, and a surfactant may be added as appropriate into the coating composition of the present invention in conventionally known proportions in the manufacturing process.

The coating composition of the present invention can be applied onto a substrate to form a cured film. An optical substrate having the cured film can be obtained using a transparent substrate suitable for optical applications.

The coating composition may be cured by heat drying or irradiation with active energy rays. Curing by heat drying is preferably performed at 70 to 200° C., and more preferably 90 to 150° C. Heat drying is preferably performed in hot air. Examples of such active energy rays include infrared rays, ultraviolet rays, and electron rays; in particular, far-infrared rays can minimize damage due to heat.

The coating composition of the present invention may be applied onto a substrate using a common method such as a dipping, spinning, or spraying method. In particular, the dipping or spraying method is preferred.

Before the coating composition of the present invention is applied to a substrate, the substrate may be subjected to a chemical treatment with an acid, alkali, or any of various organic solvents or detergents, or to a physical treatment with plasma, ultraviolet rays, or the like, to improve the adhesion between the substrate and the cured film. The substrate may also be subjected to a primer treatment with any of various resins to further improve the adhesion between the substrate and the cured film.

The cured film formed using the coating composition of the present invention can be used as a high-refractive-index film for an anti-reflective coating. The cured film can also be used as a multi-functional film by adding components having anti-fogging, photochromic, anti-fouling, and other functions.

An optical member having the cured film formed using the coating composition of the present invention can be used for glasses lenses as well as camera lenses, windshields for automobiles, and optical filters for liquid crystal displays and plasma displays, for example.

The optical member of the present invention has the cured film formed using the coating composition of the present invention, on the surface of an optical substrate; on the cured film, an anti-reflective coating formed of a vapor-deposited film of an inorganic oxide can be formed. The anti-reflective coating is not limited to a particular anti-reflective coating; a conventionally known monolayer or multilayer vapor-deposited film of an inorganic oxide may be used. Examples of the anti-reflective coating include those disclosed in Japanese Patent Application Publication No. 2-262104 (JP 2-262104 A) and Japanese Patent Application Publication No. 56-116003 (JP 56-116003 A), for example.

EXAMPLES

Examples of the present invention will be hereinafter described; however, the present invention is not limited thereto. Physical properties were measured using the following methods:

Moisture content: the moisture content was determined by the Karl Fischer titration method.

Particle diameter: the sol was dried on a copper mesh and then observed under a transmission electron microscope (model: JEM-1010 from JEOL Ltd.; acceleration voltage: 100 kV) to measure particle diameters of 100 particles; the average value of the measured diameters was determined as the primary particle diameter.

Specific gravity: the specific gravity was determined using a hydrometer method (20° C.)

Viscosity: the viscosity was measured using an Ostwald viscometer (20° C.)

Production Example 1

In 400 g of pure water, 36 g of JIS No. 3 sodium silicate (having a $SiO_2$ content of 29.8% by mass; from Fuji Kagaku Corporation) and subsequently 9.8 g of sodium stannate $NaSnO_3 \cdot H_2O$ (having a $SnO_2$ content of 55.1% by mass; from Showa Kako Corporation) were dissolved. The resulting aqueous solution was passed through a column packed with a hydrogen-type cation exchange resin (Amberlite (registered trademark) IR-120B) to give 1,240 g of an aqueous sol of acidic stannic oxide-silica complex colloidal particles (pH 2.4; having a $SnO_2$ content of 0.44% by mass and a $SiO_2$ content of 0.87% by mass; $SiO_2$ $SnO_2$ mass ratio: 2.0). Subsequently, 3.2 g of diisopropylamine was added to the resulting aqueous sol. The resulting sol was an aqueous sol of alkaline stannic oxide-silica complex colloidal particles with a pH of 8.0. From transmission electron microscopic observation, the aqueous sol was found to be colloidal particles having a primary particle diameter of 5 nm or less. The diisopropylamine/($SnO_2$ $SiO_2$) molar ratio was 0.15.

Production Example 2

A 1-liter glass container was charged with 251.85 g of an aqueous solution of tetramethylammonium hydrogen carbonate (having a tetramethylammonium hydroxide content of 42.4% by mass; from Tama Chemicals Co., Ltd.) and 95.6 g of pure water to prepare a dilute aqueous solution. While this aqueous solution was stirred, zirconium oxycarbonate powder ($ZrOCO_3$ from AMR; having a $ZrO_2$ content of 40.1% by mass) was gradually added into the aqueous solution in a total amount of 491.85 g. After completion of the addition, the resulting mixture was heated to 85° C., and then 8.23 g of metastannic acid (having a $SnO_2$ content of 7.08 g; from Showa Kako Corporation) was gradually added thereto. The resulting mixture was then aged by heating at 105° C. for 5 hours. At the completion of the aging by heating, the mixture was in the form of a sol. The mixture was further subjected to a hydrothermal treatment at 145° C. for 5 hours. The hydrothermal treatment produced a sol containing zirconium oxide-stannic oxide complex colloidal particles having a ($ZrO_2+SnO_2$) concentration of 12.86% by mass, a specific gravity of 1.180, and a pH of 10.62. This sol was subsequently washed with pure water in an ultrafiltration apparatus and concentrated to produce 1,040 g of a sol containing zirconium oxide-tin oxide complex colloidal particles having a concentration of 6.03% by mass, a specific gravity of 1.052 and a pH of 9.43. From electron microscopic observation, the resulting zirconium oxide-stannic oxide complex colloid was found to have a particle diameter of 5 to 15 nm.

Production Example 3

To 830 g of the aqueous sol of zirconium oxide-stannic oxide complex colloidal particles prepared in Production Example 2 (having a total metal oxide content of 50 g), 769 g of the aqueous sol of alkaline stannic oxide-silica complex colloidal particles prepared in Production Example 1 were added, and the mixture was thoroughly stirred. The mixture was subsequently aged by heating at 95° C. for 2 hours to produce 1,599 g of an aqueous sol of modified zirconium oxide-stannic oxide complex colloidal particles coated with the stannic oxide-silica complex colloidal particles. The resulting sol had a pH of 8.3 and a total metal oxide concentration of 3.7% by mass. The resulting aqueous sol of modified zirconium oxide-stannic oxide complex colloidal particles was passed through a column packed with a hydrogen-type cation exchange resin (Amberlite IR-120B) to produce 1,980 g of an aqueous sol of acidic modified zirconium oxide-stannic oxide complex colloidal particles. The resulting sol had a of 2.7 and a total metal oxide concentration of 3.0% by mass. To the resulting acidic sol, 0.5 g of diisobutylamine was added, so that the diisobutylamine was bonded to the surface of the modified zirconium oxide-stannic oxide complex colloidal particles. The sol had a pH of 4.3. The resulting sol was subsequently concentrated to a total metal oxide concentration of 20% by mass, using an ultrafiltration apparatus. The concentrated sol had a specific gravity of 1.211 and a pH of 3.7. The concentrated aqueous sol was charged into an evaporator with an eggplant-shaped flask, and the water in the aqueous sol was distilled off at 600 Torr while methanol was added to the sol. This produced a methanol-dispersed sol of modified zirconium oxide-stannic oxide colloidal particles to which diisobutylamine was bonded. The resulting methanol-dispersed sol had a specific gravity of 1.184, a viscosity of 3.2 mPa·s, a pH of 4.9 (diluted with the same mass of water as that of the sol), a total metal oxide concentration of 38.5% by mass, and a moisture content of 0.8%.

Example 1

To a glass container with a magnetic stirrer was added 240 parts by mass of γ-glycidoxypropyltrimethoxysilane. To this was added 110 parts by mass of a water-dispersed silica sol (SNOWTEX O; silica concentration: 20% by mass, primary particle diameter: 12 nm; from Nissan Chemical Industries, Ltd.) with stirring, and the mixture was stirred for 24 hours to produce a partial hydrolysate of γ-glycidoxypropyltrimethoxysilane. Subsequently, 290 parts by mass of a methanol-dispersed sol of titanium oxide-zirconium oxide-stannic oxide complex colloidal particles modified with a stannic oxide-silica complex colloid obtained as in Production Example 5 described in Japanese Patent Application Publication No. 2012-31353 (JP 2012-31353 A) (having a total metal oxide content of 30.0% by mass) and 180 parts by mass of propylene glycol monomethyl ether were added to 313 parts by mass of the partial hydrolysate of γ-glycidoxypropyltrimethoxysilane. The mixture was further blended with 5.2 parts by mass of aluminum acetylacetonate as a curing agent and 9.0 parts by mass of a leveling agent, L-7001 (from Dow Corning Toray Co., Ltd.), diluted with methanol to a concentration of 10% by mass, The mixture was thoroughly stirred to prepare a coating solution for hard coating.
(Formation of Cured Film)
A polycarbonate plastic lens (refractive index $n_D$=1.58) was prepared. The above-described coating solution for hard coating was applied (film thickness: 3 μm) to the lens using a dip coating method, and heat-treated at 120° C. for 2 hours to cure the coating film. The evaluation results are shown in Table 1.

Example 2

The same procedures as those described in Example 1 were performed, except that 290 parts by mass of the methanol-dispersed sol of titanium oxide-zirconium oxide-stannic oxide complex colloidal particles modified with the stannic oxide-silica complex colloid (having a total metal oxide content of 30.0% by mass) described in Example i was replaced by 229 parts by mass of the methanol-dispersed sol of zirconium oxide-tin oxide complex colloidal particles modified with the stannic oxide-silica complex colloid (having a total metal oxide content of 38% by mass) described in Production Example 3.

Example 3

The same procedures as those described in Example 1 were performed, except that the water-dispersed silica sol described in Example 1 was replaced by 145 parts by mass of SNOWTEX OXS (silica concentration: 15% by mass, primary particle diameter: 6 nm; from Nissan Chemical Industries, Ltd.).

Example 4

The same procedures as those described in Example 1 were performed, except that the water-dispersed silica sol described in Example 1 was replaced by 110 parts by mass of SNOWTEX OL (silica concentration: 20% by mass, primary particle diameter; 40 nm; from Nissan Chemical Industries, Ltd.).

Comparative Example 1

To a glass container with a magnetic stirrer was added 240 parts by mass of γ-glycidoxypropyltrimethoxysilane, and 60 parts by mass of 0.01 N hydrochloric acid was added dropwise thereto with stirring over 3 hours. After the completion of the dropwise addition, the mixture was stirred for 0.5 hour to produce a partial hydrolysate of γ-glycidoxypropyltrimethoxysilane. Subsequently, 290 parts by mass of a methanol-dispersed sol of titanium oxide-zirconium oxide-stannic oxide complex colloidal particles modified with a stannic oxide-silica complex colloid obtained as in Production Example 5 described in Japanese Patent Application Publication No. 2012-31353 (JP 2012-31353 A) (having a total metal oxide content of 30.0% by mass) and 110 parts by mass of a water-dispersed silica sol (SNOWTEX O) were added in this order, and the mixture was stirred. The mixture was further blended with 180 parts by mass of propylene glycol monomethyl ether, 5.2 parts by mass of aluminum acetylacetonate as a curing agent, and 8.5 parts by mass of a leveling agent, L-7001 (from Dow Corning Toray Co., Ltd.), diluted with methanol to a concentration of 10%. The mixture was thoroughly stirred to prepare a coating solution for hard coating.

(Formation of Cured Film)

The same procedures as those described in Example 1 were performed.

Comparative Example 2

The same procedures as those described in Comparative Example 1 were performed, except that 110 parts by mass of the water-dispersed silica sol (SNOWTEX O) and 290 parts by mass of the methanol-dispersed sol of titanium oxide-zirconium oxide-stannic oxide complex colloidal particles modified with the stannic oxide-silica complex colloid (having a total metal oxide content of 30.0% by mass) were added in this order to the partial hydrolysate of γ-glycidoxypropyltrimethoxysilane described in Comparative Example 1.

Comparative Example 3

The same procedures as those described in Example 1 were performed, except that the water-dispersed silica gel used was replaced by 55 parts by mass of SNOWTEX MP1040 (silica concentration: 40% by mass, primary particle diameter: 100 nm; from Nissan. Chemical industries, Ltd.).

Comparative Example 4

To a glass container with a magnetic stirrer was added 240 parts by mass of γ-glycidoxypropyltrimethoxysilane, and 60 parts by mass of 0.01 N hydrochloric acid was added dropwise thereto with stirring over 3 hours. After the completion of the dropwise addition, the mixture was stirred for 0.5 hour to produce a partial hydrolysate of γ-glycidoxypropyltrimethoxysilane. The partial hydrolysate was subsequently blended with 145 parts by mass of a methanol-dispersed sol of titanium oxide-zirconium oxide-stannic oxide complex colloidal particles modified with a stannic oxide-silica complex colloid obtained as in Production Example 5 described in Japanese Patent Application Publication No. 2012-31353 (JP 2012-31353 A) (having a total metal oxide content of 30.0% by mass), as well as 180 parts by mass of propylene glycol monomethyl ether, 0.9 part by mass of aluminum acetylacetonate as a curing agent, and. 9.0 parts by mass of a leveling agent, L-7001 (from Dow Corning Toray Co., Ltd.), diluted with methanol to a concentration of 10%. The mixture was thoroughly stirred to prepare a coating solution for hard coating.

(Formation of Cured Film)

The same procedures as those described in Example 1 were performed.

Comparative Example 5

The same procedures as those described in Example 1 were performed, except that 145 parts by mass of the methanol-dispersed sol of titanium oxide-zirconium oxide-stannic oxide complex colloidal particles modified with the stannic oxide-silica complex colloid (having a total metal oxide content of 30.0% by mass) described in Comparative Example 4 was replaced by 435 parts by mass of the water-dispersed silica sol (SNOWTEX O).

Optical members having the cured films obtained in the above-described Examples and Comparative Examples were evaluated for various physical properties, using the following testing methods.

(1) Scratch Resistance Test

The surface of the cured film was rubbed back and forth 10 times with #0000 steel wool, and the extent to which the surface was scratched was visually determined. The evaluation criteria were as follows:

A: No scratches were observed.

B: A few scratches were observed/three or less scratches per $cm^2$ were observed.

C: Noticeable scratches were observed/10 or less scratches per $cm^2$ were observed, but no peeling of the film was observed.

D: Peeling of the film was observed.

(2) Adhesion Test

The cured film was crosscut into 100 sections at intervals of 1 mm, an adhesive tape (Cellotape from Nichiban Co., Ltd.) was strongly stuck to the crosscut sections, and then the adhesive tape was rapidly peeled off. The presence or absence of peeling of the cured film after peeling of the adhesive tape was examined. The evaluation criteria were as follows:

A: No peeling was observed.

B: Peeling of 1 to 30 sections out of 100 sections was observed.

C: Peeling of 31 to 60 sections out of 100 sections was observed.

D: Peeling of 61 to 90 sections out of 100 sections was observed.

E: Peeling of 91 or more sections out of 100 sections was observed.

(3) Adhesion Test after Weathering Test

The cured film was irradiated with a xenon weather meter (radiation intensity: 40 $MW/m^2$) for 100 hours. The film was then crosscut and tested as in (2) Adhesion Test to examine the presence or absence of peeling of the cured film after peeling of the adhesive tape. The evaluation criteria described in (2) Adhesion Test were used.

(4) Crack Resistance Test

The cured film was irradiated with a xenon weather meter (radiation intensity: 40 $mW/m^2$) for 100 hours, and then the presence or absence of cracks in the film was visually examined. The evaluation criteria were as follows:

A: No cracks were observed.

B: Cracks were observed in a portion of the film.

C: Cracks were observed all over the film.

(5) Transparency Test

The presence or absence of clouding of the cured film was visually examined under a fluorescent lamp in a dark room. The evaluation criteria were as follows:

A: Substantially no clouding was observed.

B: Clouding was negligible for a transparent cured film.

C: Noticeable whitening was observed.

(6) Interference Fringe Test

The presence or absence of interference fringes on the cured film was visually examined under a fluorescent lamp in a dark room. The evaluation criteria were as follows:

A: No interference fringes were observed.

B: A few interference fringes were observed.

C: Noticeable interference fringes were observed.

(7) Refractive Index

The refractive index was measured with an Abbe refractometer.

The results are shown in Table 1.

TABLE 1

|  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Scratch Resistance | A | A | A | A | C | C | B | D | A |
| Adhesion | A | A | A | A | B | B | A | C | A |
| Adhesion after Weathering Test | A | A | A | A | D | D | B | E | A |
| Crack Resistance | A | A | A | A | B | B | B | C | B |
| Transparency | A | A | A | B | C | C | D | A | A |
| Interference Fringes | A | A | A | A | B | B | C | A | C |
| Refractive Index | 1.61 | 1.60 | 1.60 | 1.60 | 1.60 | 1.60 | 1.49 | 1.58 | 1.49 |

The cured films of Examples 1 to 4 of the present invention were excellent in scratch resistance, adhesion, adhesion after the weathering test, transparency, and weather resistance (crack resistance) after outdoor exposure. In contrast, the cured films of Comparative Examples 1 and 2 were markedly poor in transparency, scratch resistance, and adhesion, because of aggregation of the silica colloidal particles and the titanium oxide-zirconium oxide-stannic oxide complex colloidal particles modified with the stannic oxide-silica complex colloid, due to a difference in surface potential. Moreover, the cured film of Comparative Example 3 was markedly poor in transparency, because the primary particle diameter of the silica colloidal particles was large. Furthermore, the cured film of Comparative Example 4 was markedly poor in scratch resistance, adhesion, and adhesion after the weathering test, because the added amount of the titanium oxide-zirconium oxide-stannic oxide complex colloidal particles modified with the stannic oxide-silica complex colloid was reduced to match the refractive index to that of the substrate. Additionally, the cured film of Comparative Example 5 exhibited interference fringes, because the cured film was composed of the silica colloidal particles only.

INDUSTRIAL APPLICABILITY

An optical member having a cured film formed using the coating composition of the present invention can be used for glasses lenses as well as camera lenses, windshields for automobiles, and optical filters for liquid crystal displays and plasma displays, for example.

The invention claimed is:

1. A coating composition comprising a component (M), a component (F), and a component (S), wherein
the component (M) is at least one silicon-containing substance selected from the group consisting of hydrolysates of organosilicon compounds of general formula (I):

$$(R^1)_a(R^3)_b Si(OR^2)_{4-(a+b)} \tag{I}$$

wherein each of $R^1$ and $R^3$ is a $C_{1-35}$ alkyl group, an aryl group, a halogenated alkyl group, a halogenated aryl group, an alkenyl group, or an organic group having an epoxy group, an acryloyl group, a methacryloyl group, a mercapto group, a ureido group, an ether group, an amino group, or a cyano group, and is bonded to a silicon atom through a Si—C bond; $R^2$ is a $C_{1-8}$ alkyl group, an alkoxyalkyl group, or an acyl group; and each of a and b is an integer of 0, 1, or 2, and a+b is an integer of 0, 1, or 2; and general formula (II):

$$[(R^4)_c Si(OX)_{3-c}]_2 Y \tag{II}$$

wherein $R^4$ is a $C_{1-5}$ alkyl group; X is a $C_{1-4}$ alkyl group or an acyl group; Y is a methylene group or a $C_{2-20}$ alkylene group; and c is an integer of 0 or 1;
the hydrolysates being obtained by hydrolyzing the organosilicon compounds of the general formula (I), the organosilicon compounds of the general formula (II), or both in the presence of the component (S) and the silicon-containing substance is contained in an amount of 20 to 85% by mass in the coating composition;
the component (F) is a modified metal oxide colloidal particle (C) having a primary particle diameter of 2 to 100 nm, which includes a metal oxide colloidal particle (A) having a primary particle diameter of 2 to 60 nm as a core, whose surface is coated with a coating (B) formed of an acidic oxide colloidal particle having a primary particle diameter of 1 to 4 nm, and the colloidal particle (C) is contained in an amount of 10 to 60% by mass in the coating composition;
the component (S) is an aqueous sol of a silica colloidal particle having a primary particle diameter of 2 to 80 nm as a catalyst, and is contained in an amount of 0.1 to 30% by mass in the coating composition;
the metal oxide colloidal particle (A) is formed of an oxide of at least one metal selected from the group consisting of Ti, Fe, Cu, Zn, Y, Zr, Nb, Mo, In, Sn, Sb, Ta, W, Pb, Bi, and Ce;
the coating (B) is formed of an acidic oxide of at least one metal selected from the group consisting of Si, Zr, Sn, Mo, Sb, and W, and
the component (S) has a pH of 1 to 6.

2. The coating composition according to claim 1, wherein the component (S) is contained in an amount of 1 to 20% by mass.

3. The coating composition according to claim 1, wherein a mass ratio of the component (F) to the component (M) is component (F)/component (M)=0.1 to 3, and a mass ratio of the component (S) to the component (M) is component (S)/component (M)=0.01 to 1.5.

4. The coating composition according to claim 1, which further comprises at least one curing catalyst selected from the group consisting of metal salts, metal alkoxides, and metal chelate compounds.

5. The coating composition according to claim 1, which further comprises at least one solvent selected from the group consisting of alcohol-based organic solvents, ether-based organic solvents, ketone-based organic solvents, ester-based organic solvents, aliphatic hydrocarbon-based organic solvents, aromatic hydrocarbon-based organic solvents, and amide compound-based organic solvents.

6. The coating composition according to claim 1, which further comprises at least one surfactant selected from the group consisting of silicone-based surfactants, acrylic-based surfactants, and fluorosurfactants.

7. An optical member comprising a cured film formed of a cured product of the coating composition according to claim 1 on a surface of an optical substrate.

8. An optical member further comprising an anti-reflective coating on a surface of the optical member according to claim 7.

9. A method for producing the coating composition according to claim 1 comprising the following steps (a) and (b):
step (a): mixing the component (M) and the component (S) to obtain a mixture in which component (M) is at least partially or completely hydrolyzed; and
step (b): mixing the mixture obtained in step (a) containing the at least partially or completely hydrolyzed product of the component (M), with the component (F).

10. The coating composition according to claim 1, wherein the coating (B) is formed of an acidic oxide of at least one metal selected from the group consisting of Si and Sn.

11. The coating composition according to claim 1, wherein component (M) is a hydrolysate of the organosilicon compound of general formula (I) wherein one of $R^1$ and $R^3$ is an organic group having an epoxy group; $R^2$ is an alkyl group; and each of a and b is 0 or 1, and a+b is 1 or 2.

12. The coating composition according to claim 1, which is obtained by a method comprising the following steps (a) and (b):
step (a): mixing the component (M) and the component (S) to obtain a mixture in which component (M) is at least partially or completely hydrolyzed; and
step (b): mixing the mixture obtained in step (a) containing the at least partially or completely hydrolyzed product of the component (M), with the component (F).

13. The coating composition according to claim 1, wherein the component (M) further comprises at least one silicon-containing substance selected from the group consisting of the organosilicon compounds of general formula (I) and the organosilicon compounds of general formula (II).

* * * * *